(12) United States Patent
Brett (10) Patent No.: US 7,992,631 B2
(45) Date of Patent: Aug. 9, 2011

(54) SYSTEM AND METHOD FOR SEASONAL ENERGY STORAGE

(76) Inventor: Kenton F. Brett, Indianapolis, IN (US)

( * ) Notice: Subject to any disclaimer, the term of this patent is extended or adjusted under 35 U.S.C. 154(b) by 1124 days.

(21) Appl. No.: 11/485,903

(22) Filed: Jul. 13, 2006

(65) Prior Publication Data

US 2007/0039715 A1 Feb. 22, 2007

Related U.S. Application Data

(60) Provisional application No. 60/699,146, filed on Jul. 14, 2005.

(51) Int. Cl.
  *F24J 3/08* (2006.01)
  *F24J 2/00* (2006.01)
  *F24H 3/00* (2006.01)
  *F25B 29/00* (2006.01)
  *F24D 19/02* (2006.01)
  *F24D 3/16* (2006.01)
  *F24F 11/06* (2006.01)
  *B65G 5/00* (2006.01)

(52) U.S. Cl. ........ 165/244; 165/47; 165/48.1; 165/48.2; 165/49; 165/56; 165/45; 165/254; 126/569; 405/56

(58) Field of Classification Search ............ 165/45, 165/47, 48.1, 48.2, 49, 53, 56, 244, 254; 65/260; 405/56; 126/569
See application file for complete search history.

(56) References Cited

U.S. PATENT DOCUMENTS

| | | | |
|---|---|---|---|
| 3,262,493 A * | 7/1966 | Hervey | 165/50 |
| 3,354,654 A * | 11/1967 | Vignovich | 405/56 |
| 3,636,721 A | 1/1972 | Rex | |
| 3,965,972 A * | 6/1976 | Petersen | 165/45 |
| 4,284,064 A * | 8/1981 | Midouhas | 126/630 |
| 4,344,414 A | 8/1982 | Balch | |
| 4,350,200 A | 9/1982 | McElwain | |
| 4,452,229 A | 6/1984 | Powers | |
| 4,674,476 A | 6/1987 | Wilson | |
| 4,920,757 A * | 5/1990 | Gazes et al. | 62/181 |
| 5,372,011 A | 12/1994 | O'Neal | |
| 5,435,380 A | 7/1995 | Yamada et al. | |
| 5,941,238 A * | 8/1999 | Tracy | 126/641 |
| 6,450,247 B1 | 9/2002 | Raff | |
| 6,681,593 B1 | 1/2004 | Gundlach | |
| 6,705,043 B1 * | 3/2004 | Opdam et al. | 47/17 |
| 2003/0000680 A1 * | 1/2003 | Schwarz | 165/45 |
| 2003/0085021 A1 * | 5/2003 | Dykes et al. | 165/58 |
| 2005/0229613 A1 * | 10/2005 | Beatenbough et al. | 62/149 |

* cited by examiner

*Primary Examiner* — Ljiljana (Lil) V Ciric
*Assistant Examiner* — Travis Ruby
(74) *Attorney, Agent, or Firm* — Maginot Moore & Beck (57) ABSTRACT

A temperature control system for a building comprises a thermal collection system, a plurality of underground heat sinks, and a heat exchanger. The thermal collection system includes at least one fluid channel. The thermal collection system is configured to heat or cool fluid within the at least one fluid channel. A first and a second underground heat sink are configured to receive the fluid from the thermal collection system. The first underground heat sink absorbs heat from the fluid in order to heat the first underground heat sink. The second underground heat sink transfers heat to the fluid in order to cool the second underground heat sink. The heat exchanger is configured to receive fluid from the first or second underground heat sink in order to heat or cool the building.

22 Claims, 7 Drawing Sheets

SYSTEM AND METHOD FOR SEASONAL ENERGY STORAGE

CROSS-REFERENCE TO RELATED APPLICATIONS

This application claims the benefit of earlier filed U.S. provisional application No. 60/699,146, filed Jul. 14, 2005. This application is related to U.S. document disclosure number 535230, entitled Seasonal Heat and Cold Storage System ("SeasStore"), filed Jul. 15, 2003.

FIELD

This application relates to a system that collects heat or cold during weather extremes and transfers the heat or cold to a insulated mass for storage until needed to heat or cool a building, or its appliances or water supply.

BACKGROUND

For ease of discussion herein, this text frequently refers to capturing, storing or delivering "cold", meaning the absence of heat. As such, "collecting cold to store in a heat sink" simply means removing heat energy from a heat sink, so that it can accept heat energy at a later time.

There are several established methods of heating and cooling homes and buildings. All of these systems represent a significant expense for businesses and residences when the initial cost and operating costs are combined. Heating oil, gas and electricity make up the bulk of energy we use for this purpose, and there are well known problems associated with our massive use of these fuels, including the expense, pollution, safety, and contribution to trade deficits and international political problems. Furthermore, summer air conditioning pushes peak demand to levels that strain our electric utilities and cause blackouts.

Efforts to solve these problems have focused on improving the systems already in place, instead of first seriously questioning the basic validity of systems that has created all these problems. Efforts are focused on improving furnace and central air conditioner efficiency, severely restricting refrigerant use, improving building methods to seal air leaks, etc.

But many of these efforts, even those perceived as successful, have downsides—some of which are generally unrecognized. For example, restricting refrigerant use ultimately expands government and regulatory bureaucracy and adds cost for consumers and taxpayers. Sealing air leaks makes indoor environments stale and less healthy.

As concern grows about energy cost and long term supplies, the inefficiencies of the established methods are more troubling. It seems wiser to collect and store free energy from the sun for use when it is needed.

For decades there have been numerous attempts to store the sun's energy on a relatively small scale. There are photovoltaic cells to make electricity. There are solar water heaters, passive solar building materials that absorb heat during the day and release it at night, and windows and skylights that can adjust to let more or less sunlight in. Over the years, innovations have generally increased the efficiency and lowered cost of these alternative systems, which may someday become widely accepted by consumers. But as of yet, none of them adequately address the seasonal needs of home and building heating and cooling.

Geothermal systems have operational cost advantages over more common systems, but still use considerable energy and are more expensive to install, which is one reason they are not prevalent after so many years on the market.

U.S. Pat. No. 5,435,380 describes a heat storage system, but uses tanks of water to store waste heat from incinerators and subway trains for later use. For long term storage of weather extremes, this has many shortcomings. It does not adequately isolate and insulate the heat and cold for such long-term storage, and its tanks would be too expensive for most residential customers. This patent belongs to Hitachi Plant Engineering & Construction Co, and may be effective for such industrial applications, but small business or residential customers may not like the idea of a water tank the size of their basement sitting in their entire back yard or just under the surface.

U.S. Pat. No. 5,941,238 describes a system for collecting and storing heat for use in heating water for home use or heating the home itself, using fluid stored in tanks made of old tires.

U.S. Pat. No. 4,350,200 describes a system that uses ducts throughout the walls, floors and roof rafters to circulate air for collecting heat and transporting it directly to water tanks for storage. This requires fundamental changes in building construction.

None of these systems collect heat in the extremes of summer to store it for use in winter when it is needed most. Furthermore, none of these systems collect "cold" in the extremes of winter and store it for use in summer when it is needed most. Such a system would need to have a large heat sink that is well insulated and poses no real or perceived danger or threat to residential customers. The established methods do not attempt this. Accordingly, it would be advantageous to provide a heat sink constructed with insulated successively hotter layers within each other.

Such a system would also need a controller designed to monitor conditions and direct the collection of heat or cold at the right time and in the method appropriate to the current weather situation, considering current storage levels and expected future needs and future losses. The established methods do not attempt this.

The system of U.S. Pat. No. 4,350,200 also uses a roof heat collection system radically different from conventional construction, including hollow extruded concrete plank beams and aluminum fins embedded in roofing tiles to conduct heat. Again this requires fundamental changes in building construction.

To become widely accepted, a system is needed that can operate very inexpensively without changing the fundamental ways buildings are constructed.

In its discussion of prior art, U.S. Pat. No. 6,681,593 mentions the need for a system of storing heat or cold from one season to the next, and mentions one previous proposal to do so by means of freezing and thawing a large pool of water. This prior art discussion claims two problems with this system: First, that it requires an equal number of heating degree days and cooling degree days, and second that the freezing process creates unmanageable problems with expansion of the pool, including damage to the reservoir walls. This method also has the previously mentioned problems associated with large expensive tanks of fluid that many residences and businesses would not want around.

U.S. Pat. No. 6,450,247 describes a system for cooling a building by using fluid circulated through a deep well (as with some geothermal systems) to cool the building without a compressor. This heats the earth around the well, so the system has additional pipes to assist the earth in dissipating that heat during the winter. This system is only designed for cooling, not heating a home. Furthermore, A-coils are commonly run at lower temperatures than the surrounding earth, so unless it is built on a very large scale, this system will be inadequate where seasonal cooling needs are great, and it will get worse as the summer cooling season wears on, and the earth around the well warms.

Accordingly, a system is needed for collecting and storing heat or cold for lengthy periods of time for later use in the heating or cooling needs of a building or residence.

SUMMARY

A system and method is disclosed herein for capturing and storing heat during hot weather and sun, and cold during cold weather, then retrieving it for use at later times, even two full seasons later or more. The exemplary disclosed system includes a system for collecting heat or cold into a heat exchange fluid; pumps, valves and lines that carry the fluid to a large underground insulated heat sink to store the heat or cold, and to retrieve it and deliver it to the building when needed; and a computer or microprocessor controlled system for monitoring and directing the above systems in combination with each other.

The exemplary disclosed system is comprised of several components outlined below.

The first component is a system for capturing the heat or cold involving one or more of the following subsystems depending on the application and weather conditions at the time. One capture method uses heat exchange coils placed in the attic of the building, with a low speed fan to promote the heat exchange. Another capture method employs direct contact with the roof through flashing that is installed under the roofing and running into the attic between decking boards. Another method encloses the space between rafters to more effectively contain and capture the heat. Another method uses large coils and higher speed fans bringing air directly from outside to more effectively capture cold during the most extreme winter nights. Being contained within the attic, these systems have the advantage of protection from damage by storms or animals, and avoid the unsightliness residential consumers associate with large rooftop systems.

Another capture method uses any of several devices external to the attic, such as concentrating collectors, flat plate collectors, and evacuated tube collectors for collecting heat at very high temperatures. Used in conjunction with the previously described attic collection systems, the size of these rooftop systems can be minimized and placed in less conspicuous locations.

Again, depending on the application and weather, any one or more than one of these collection systems may be used in conjunction with each other.

The second component of the automatic comprehensive system is a heat sink buried underground consisting of water, components of earth such as sand, dirt, gravel, or stone or a mixture thereof, and heat exchange coils buried within. The heat sink may be layered to increase efficiency and decrease long term storage losses, with successively hotter layers enclosed within the next, in a sort of "onion design", with the layers being separated by a water impermeable barrier. Each barrier may also include insulation.

This second component is replicated for cold storage. Accordingly, the disclosed system may include two separate heat sinks, with one for heating and one for cooling.

The third component of the automatic comprehensive system is a heat exchanger system within the building for the purpose of adding the heat to the home or building. Here again there are alternatives. One system uses forced air from a multi-speed fan through an A-coil and then through ducts to disperse the heat or cold throughout the home or building. The A-coil is supplied with hot or cold liquid retrieved from the heat sink as needed. Another uses radiators along the outside walls of the building. Another uses radiant floor heat. These radiating systems would be supplied by hot or cold liquid retrieved from the heat sink as needed.

Radiant floor heat is becoming more popular due to comfort advantages because the heat is more evenly dispersed both vertically and across the whole floor instead of having a large cold floor with a few hot spots. Some also consider it healthier to avoid blowing air through ducts which are hard to keep clean of mold and dirt. Radiant floors are also more energy efficient and usually operated at lower temperatures than other heat systems. Radiant floor heating uses heat transfer fluid as low as 85 degrees—an advantage for the current invention.

The fourth component of the automatic comprehensive system is a central processing unit that monitors weather conditions, time and date, and the various current conditions within the heat sinks and then compares this data with historical weather data and system characteristics such as heat sink size and insulation properties and heat or cold collection capacities to forecast heat or cold losses over time and to make multiple decisions regarding actions to take. Such actions would include which heat or cold collection subsystems to employ, if any; what speeds to run the pumps and/or fans, if any; and what layer or layers of the heat sink to route the heat transfer fluid through, if any, in order to obtain the desired storage, withdrawal, and home conditioning objectives.

The fifth component of the automatic comprehensive system is the various fluid lines, coils, valves and pumps needed to carry out the decisions of the central processing unit.

The sixth component of the automatic comprehensive system is a notification system to warn the user if a potential problem is detected. The central processing unit monitors conditions and automatically analyzes for disparities or indications of problems, by comparing heating or cooling use to background data such as the outdoor temperatures, wind and the heat or cold use expected under those conditions. If a potential problem is detected, the user is notified in any of several possible ways. A message may be sent to a readout at the thermostat, an intermittent beep may be used to call attention to the message, or in more serious situations, a louder, more sustained alarm could sound, or wireless notifications could be sent through any number of media.

A possible seventh component of the automatic comprehensive system is a link to a remote monitoring station which is manned. This station receives periodic reports of conditions at the various remote locations, and performs analyses similar to the on-site central processing units.

For example, if someone in Minnesota is on a winter vacation in Florida, and a burglar leaves a window open, an excessive use of heat would be seen at that residence, and the remote station would see a dramatic spike in heating use. Lesser problems would also be noticeable, although they might take more time to identify. For example, if a resident fails to close storm windows for winter, then as the outside temperatures begin to fall, a pattern of consistently higher than expected heat usage will be apparent. Upon noticing a problem, the action taken by the monitoring station would depend on the severity. If excess usage is very low there would be no action taken. If a sharp, unexplained increase is seen, a concerted effort may be made to contact the occupant and if necessary, check the system in person. Other steps could be taken, depending on the severity of the aberration: e-mail notifications, post cards, automated phone calls, etc. The sensitivity of this monitoring and warning system may be set by an installer or the user.

In one embodiment, a measurement is provided for the total remaining capacity for the current season's needs, as compared to the needs expected based on historical weather data. There are many potential factors to consider for calculating these expectations. Again, if the monitor determines a shortage is likely to occur, the occupant may be notified, whereupon he may adjust the demand on the system or prepare for use of a back-up system.

Operating costs for the current invention are very small when compared with today's most commonly used systems. The collecting fans will nearly always run at very low speed—just enough to keep the air circulating. Likewise the pumping of the heat exchange fluid is normally slow, and under very low pressure throughout the system. On the very coldest winter nights these rates may be relatively high. The other main operating expense is the blower fan for circulating home air through the A-coil and ducts. This can operate at a lower speed than in the past, because unlike today's common systems which are either off or full-on, the current invention can run continuously with no ill effects, as the central processing unit selects the appropriate level within the heat sink to draw from.

Fan and pump speed are a consideration in operating cost because the amount of energy they use is counterintuitive. It takes eight times as much power to double the speed of air or heat exchange fluid, because force is a function of both mass and the square of velocity. As velocity doubles, so does mass, and so power is a cubic function. This is an advantage for the current invention, with its low speed pumps and fans.

The collectors and heat sinks must meet some minimum size requirements to ensure proper operation. In constructing the system, historical climate data will help determine the optimal size for the core and each layer. First, the size and temperature demand is estimated based on the most demanding winter in history. For the core, we could look at the historical winter with the most extremely cold days. For the next layer, we use additional data from the next coldest days in a record year. That may be a different historical winter for each layer. Heating degree day (HDD) data would be more informative wherever it can be found in the records.

Other factors are also taken into account. For example, the demand for high rates of heating will taper off in spring, just as the reserves are becoming depleted. So the historical lows for early spring days may be significant factors in determining final capacity needs.

In this way, sizing is done working from the core outward, and the outer shell is determined based on the year with the highest heat demand over the entire winter; and on the storage capacity and expected time losses of the inner layers which have already been calculated. Once the minimum temperature needed for each layer has been determined, this data is used in the controller's algorithm for controlling heat collection. Another data set needed is the minimum amount of collection opportunity expected in a given season, and the minimum amount of replenishment opportunity expected in the off season. Using a selected base temperature, a comparison can be made between the layers based on relative need, and expected future opportunity for heat collection at conditions optimal for that layer.

As an example, consider a late May in Indiana where the heating season is over, and the process of collecting heat for next winter has begun. If the core is down to 97° and the outermost layer is only 68°, then an unusually hot, calm sunny day would present an opportunity normally ideal for heating the core, as collection temperatures could reach more than 200°. But the controller may instead select a fast transfer fluid rate, routing the heat to the outer storage layer, if that layer currently has the greatest heat deficit relative to its goal, and considering the high probability that additional hot days will occur in July and August. Heating the outer layers first will provide insulation for the core, and the higher flow rate increases the overall BTUs collected, since there is a greater temperature differential at the point of collection.

Once the desired temperatures of all heat sink layers have been achieved, the controller monitors the retained heat for losses, reports any unusual losses, and replenishes losses when the opportunity exists. Beyond that, choices may also be made by the user, or set initially upon installation (subject to later changes). The user could opt for a greater margin of safety, where the system attempts to add an additional amount of heat to each layer if weather allows. Or the user could simply set the system to add the most heat possible to the system, in order to have an expendable reserve in the spring to leave windows open for fresh air, without fear of emptying reserves.

The above described exemplary components, features and advantages, as well as others, will become more readily apparent to those of ordinary skill in the art by reference to the following detailed description and accompanying drawings.

DESCRIPTION

Figure 1:
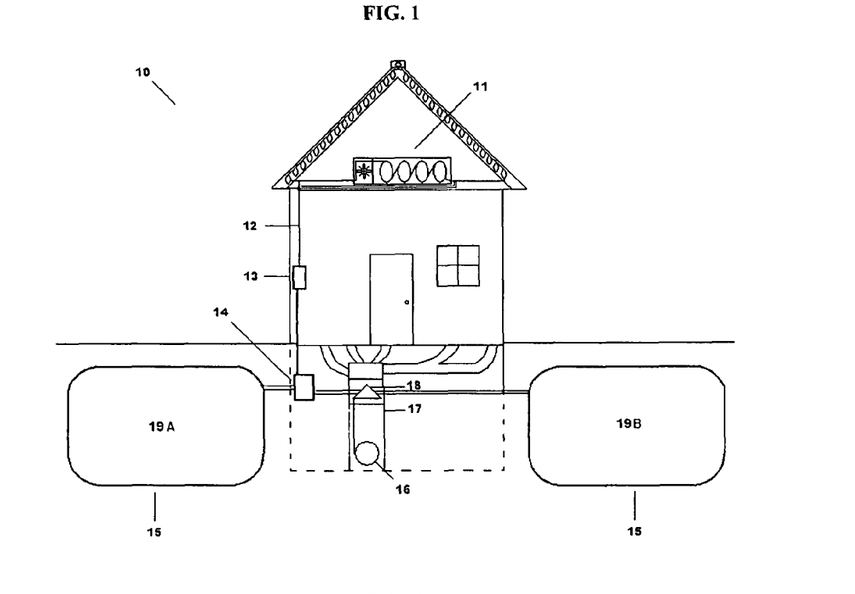
FIG. 1 is a simplified illustration of an exemplary system built in accordance with the present invention.

With reference to FIG. 1, a seasonal heat and cold storage system 10 is shown. The system 10 includes a plurality of subsystems. A first subsystem is a heat collection system 11 generally provided on the roof and/or attic of a building. Through heat transfer fluid channels/lines 12 (sometimes referred to herein as "coils"), the heat collection system 11 is connected to a second subsystem, in particular, a heat sink system 15 includes a first heat sink 19A generally provided underground and a second heat sink 19B also generally provided underground. The heat sink 19A and the heat sink 19B are each connected to a heat exchanger 17, which is the fourth subsystem of the comprehensive system 10. The heat exchanger 17 is comprised of the A-coil 18 and a multispeed fan 16. A central processing unit 14 is the fourth subsystem. The central processing unit 14 is connected to the user interface 13 for control of the comprehensive system 10.

Figure 2:
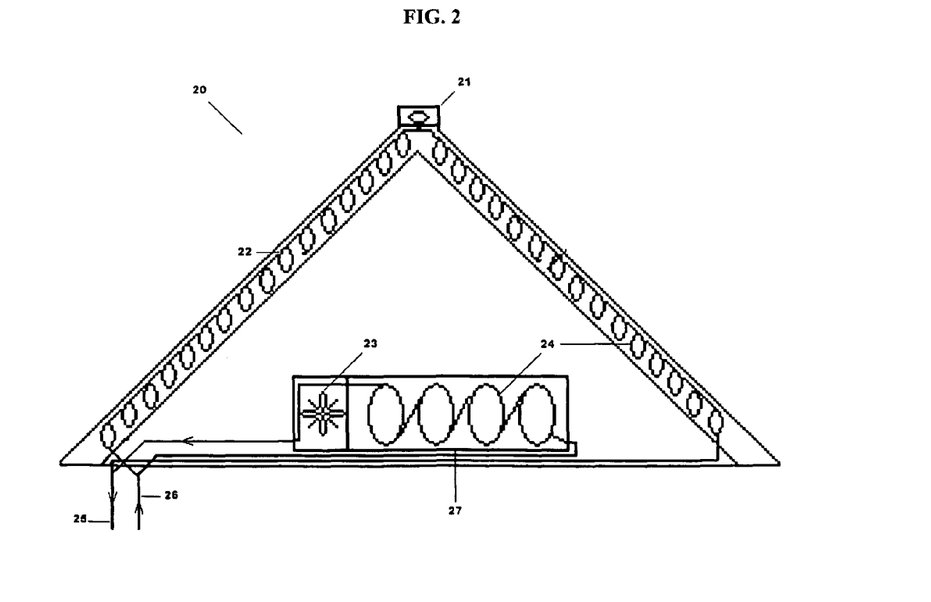
FIG. 2 is a simplified illustration of an exemplary heat collection system built in accordance with the present invention.

With reference to FIG. 2, the heat collection system 20 generally comprises a heat transfer fluid line 26 leading to a heat concentrator 21, which is connected to the return fluid line 25. The heat concentrator 21 focuses radiant energy from the sun to superheat a liquid flowing through it. It may be mounted on the rooftop, as shown, or just under the roof decking, having the external appearance of a skylight. In one embodiment, an ambient heat transfer unit 27 is either substituted, or installed in series with the heat concentrator 21. The ambient heat transfer unit 27 is comprised of a multi-speed fan 23 and a heat transfer coil 24. The heat concentrator uses sunlight focused onto an energy absorbing surface, and transfers the heat to the fluid flowing through it. One of skill in the art will recognize that the heat concentrator may be provided in any of several forms, such as a parabolic concentrator or evacuated tube collector.

In another embodiment, an enclosed rafter cavity heat transfer unit 22 is either substituted for or installed in series with the ambient heat transfer unit 27 and the heat concentrator 21. The enclosed rafter cavity heat transfer unit 22 is comprised of a hinged lid that closes on the cavity between rafters containing a heat transfer coil 24. In another embodiment, the enclosed rafter cavity heat transfer unit 22 is also comprised of flashing made of a high heat conductive material. Such materials may include certain metals and modern superconductive materials that are becoming possible with advances in nanotechnology.

Figure 3A:
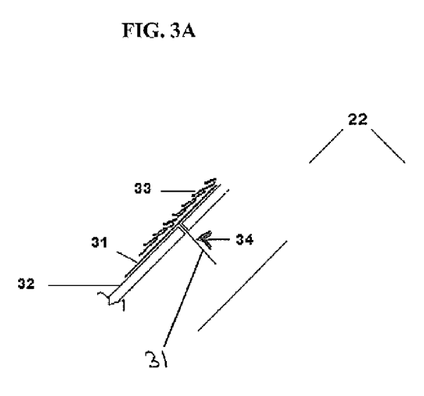
FIGS. 3A and 3B show a simplified illustration of an exemplary enclosed rafter cavity heat transfer unit built in accordance with the present invention.
Figure 3B:
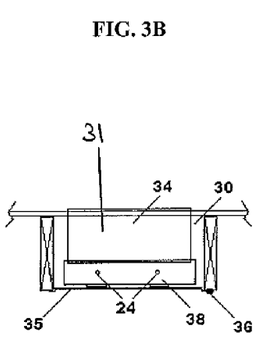

With reference to FIGS. 3A and 3B, the enclosed rafter cavity heat transfer unit 22 is shown in greater detail. The flashing 31 is affixed to the roof decking 32 and bent into the rafter cavity 34 before the next piece of roof decking is installed. The shingles or other final roofing materials 33 are affixed in the usual manner to the roof decking 32. In one embodiment, the flashing 31 is in contact with the heat transfer coil 24 of FIG. 2. Because the flashing is comprised of high heat conductive material, the flashing operates to transfer heat directly to the rafter cavity 34 and/or to the coils 24 of the heat collection system 11.

FIG. 3B provides a cross-sectional view of the enclosed rafter cavity heat transfer unit 22. The lid 35 is made of a durable inexpensive material such as plastic, and is fixed to one rafter either with a hinge 36, or simply stapled, nailed or screwed to the rafter, and having a manufactured crease to provide the hinging function. The other side of the lid 35 is closed to the next rafter with any of several traditional locking systems such as Velcro, snap-lock, ledge and tray or screws. The coil tubing 24, with heat conductive fins 38 may be in physical contact with the conductive roof flashing 39 as it runs through the rafter cavity 35.

Figure 4:
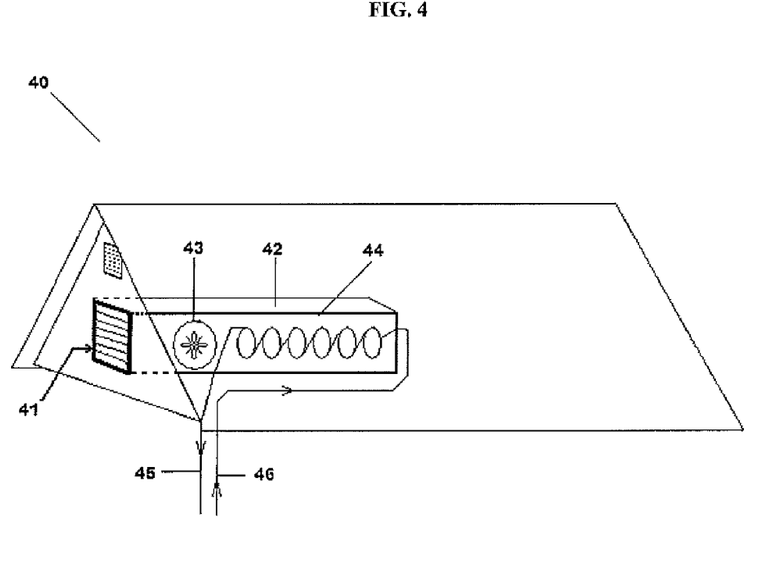
FIG. 4 is a simplified illustration of an exemplary cold collection system built in accordance with the present invention.

With reference to FIG. 4, a cold collection system 40 generally comprises a heat transfer fluid line 46 leading to a cold collection unit 42 which is comprised of a heat transfer coil 44 and a multispeed fan 43. The cold collection unit 42 is connected to ambient air via a gable vent 41 or another screened vent to outside the building. The cold collection unit 42 is connected to the return fluid line 45.

With reference to FIGS. 5A-5D, construction stages for one embodiment of a heat sink of the heat sink system 15 are shown. As mentioned previously, the heat sink system 15 is configured to retain heat or cold, and separate heat sinks may be provided, including one heat sink designated for retention of heat, and another heat sink designated for the retention of cold. The heat sink represented in FIGS. 5A-5D is a two layer heat sink, including an outer layer 59 and a central core 53.

Figure 5A:
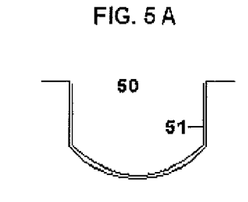
FIG. 5 is a simplified illustration of an exemplary heat sink built in accordance with the present invention.
Figure 5B:
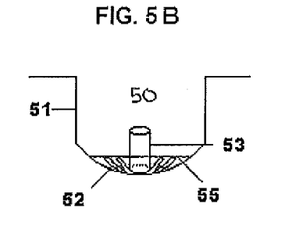
Figure 5C:
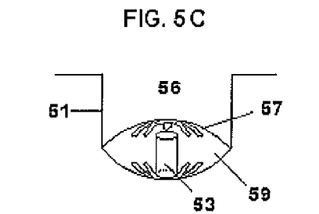
Figure 5D:
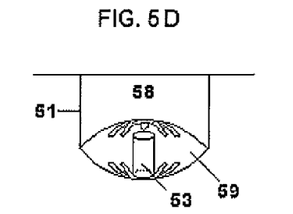
Figure 6:
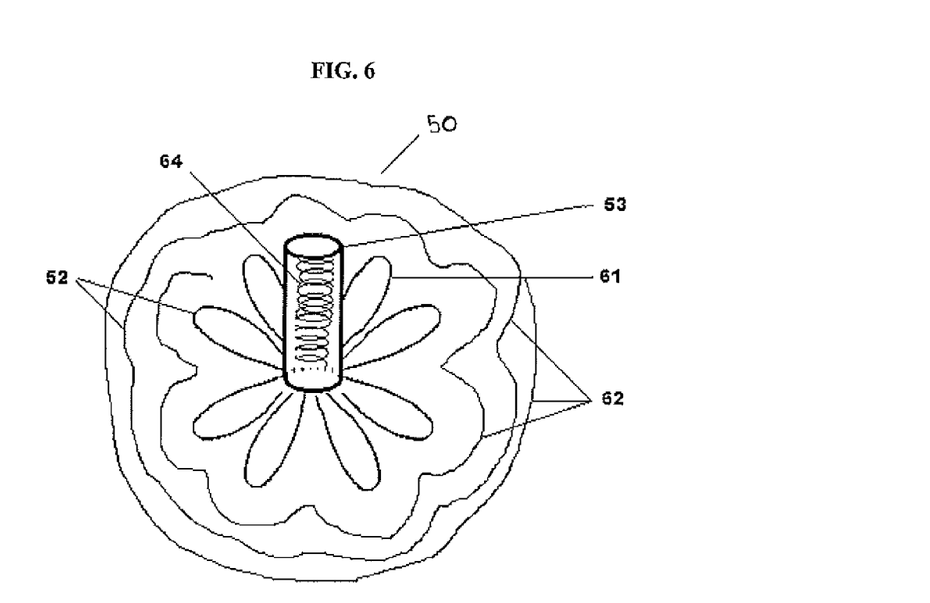
FIG. 6 is a simplified detail illustration of an exemplary heat sink core and coils built in accordance with the present invention.

When constructing the heat sink system 15, earthen soil is first removed to form a pit 50, as shown in FIG. 5A. If the soil type is not conducive to sheer walls, walls must be sloped to prevent collapse during construction. The pit 50 is then lined with an impervious membrane 51 or other insulation envelope that provides insulation to the layer (e.g., insulation against heat transfer and/or intrusion of elements and/or organisms. As shown in FIG. 5B, heat transfer coils 52 for the outer layer 59 are installed in the pit and buried in sand 55 for protection during backfill. The coils 52 carry fluid to transfer heat to or from the outer layer 59 of the heat sink. Next the core 53, which is detailed later in FIG. 6, is installed and the remainder of the heat sink is backfilled with soil. As explained below, the core 53 also includes fluid channels configured to deliver heat or cold to the core 53. In one embodiment, the core 53 is a manufactured unit contained within a water-impervious plastic housing which includes fluid inlet port and outlet port. In another embodiment, the core 53 is constructed on site from soil and fluid channels placed within an insulation envelope, similar to the construction of the outer layer 59, as disclosed herein. Water is added to the outer layer (and core, if appropriate) for its capacity to store and transfer heat, but care is taken not to over-saturate so as to prevent fluidization of the soil. As shown in FIG. 5C, another set of heat transfer coils 57 are added near the top of the outer layer 59 for retrieval of heat, and the impervious membrane 51 is closed to seal the system, completing the heat sink mass 56. The remaining pit is backfilled with earthen soil to complete the heat sink 58. Depending on the design of the heat sink, one or more types of soil, such as clay, silt, sand, loam, or combinations thereof may be used to backfill each layer. The soil may be taken from the heat pit dug during creation of the heat sink or may be trucked to the pit when a particular type of soil is desired. In alternative embodiments, the core and outer layer of the heat sink may be comprised of other materials such as water, rock, gravel, concrete, asphalt or other material.

With reference to FIG. 6, a detail of the heat sink bottom coils 52 and core 53 is shown as viewed from above the pit 50. Inner coils 61 and outer coils 62 are installed with adequate spacing to contact a large area of the heat storage mass. The core 53, with its separate internal heat transfer coil 64 is installed above. The core 53 may be a shell made of any rigid material that will hold wet sand long enough to complete the installation. For this purpose, a spherical or cylindrical shape would be best. Inexpensive dense fiberboard cylindrical forms for pouring concrete pilings may be used. The core 53 is filled with dry sand or other soil poured around the coil 64 and the sand is saturated with water but not to the point of fluidization. The core 53 is then sealed in an insulation envelope, such as an impervious membrane made of plastic, to isolate the core from the outer layer. Additional insulation, such as spray foam may be added to further isolate the core from the outer layer. Insulation may also be added adjacent to the impervious membrane 51 in FIG. 5A to isolate the outer layer from the surrounding earth.

The system shown in FIGS. 5A-5D and FIG. 6 includes a core and an outer storage mass, and would be considered a two-layer storage mass. The preferred embodiment uses a storage mass with four roughly concentric layers, each layer separated from the others with insulation and impervious membrane 51 as shown in the two-layer storage mass of FIGS. 5A-5D. Each layer has separate heat transfer coils that are connected to each other through valves that may be external to the mass and are controlled by the CPU 14 of FIG. 1, such that heat transfer fluid may be passed through any layer or combination of layers, as determined by the CPU 14 of FIG. 1. The construction of each outer layer in a three or more-layered system is the same as described for the outer layer of the two-layered system.

Figure 8:
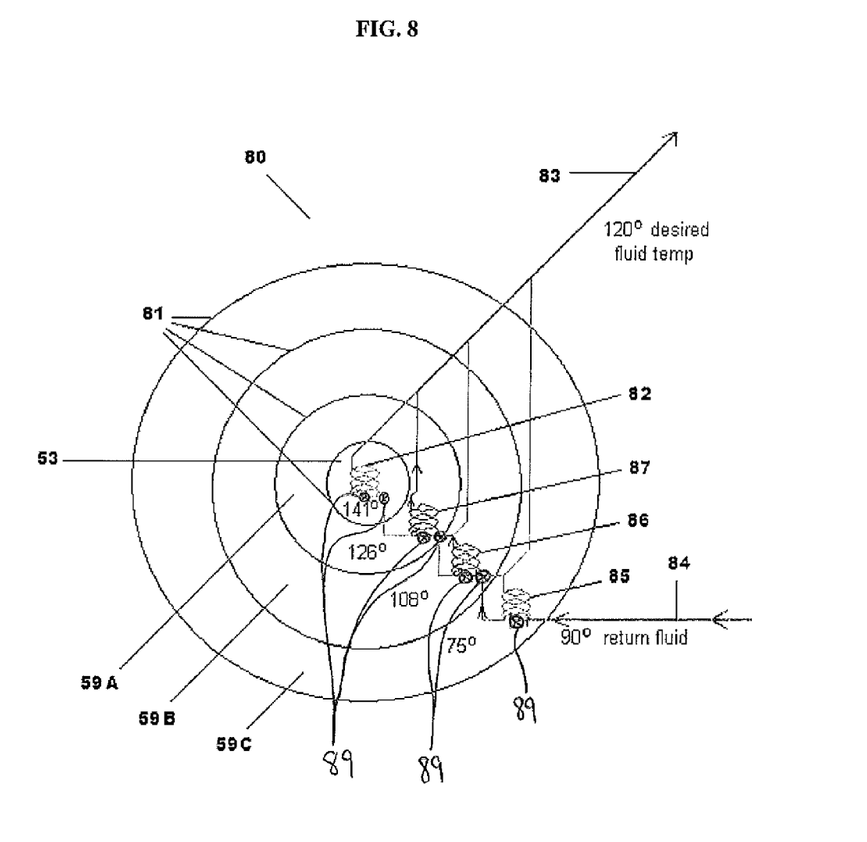
FIG. 8 is a simplified schematic of an exemplary heat sink built in accordance with the present invention.

With reference to FIG. 8, a simplified schematic of a heat sink/storage mass 80 of one embodiment is shown. The heat sink 80 is representative of either the first heat sink 19 A or the second heat sink 19 B of FIG. 1. As shown in FIG. 8, the heat sink 80 is layered by placing successive layers of earthen material in a nested arrangement with insulation/impermeable membranes 81 between adjacent layers. Heat transfer coils 82, 85, 86, and 87 are placed within each layer and connected to the building with a supply line 83 and a return line 84. Valves 89 are provided between the coils, allowing the system to select the path of fluid transfer through the heat sink 80. For example, certain valves may be opened and others closed to allow the fluid to pass through the core 53, but block fluid flow through any of the successive outer layers 59 A-59 C. Similarly, certain valves may be opened and others closed to allow the fluid to pass through outer layer 59 A without passing through the core 53 or outer layers 59 B or 59 C.

Figure 7:
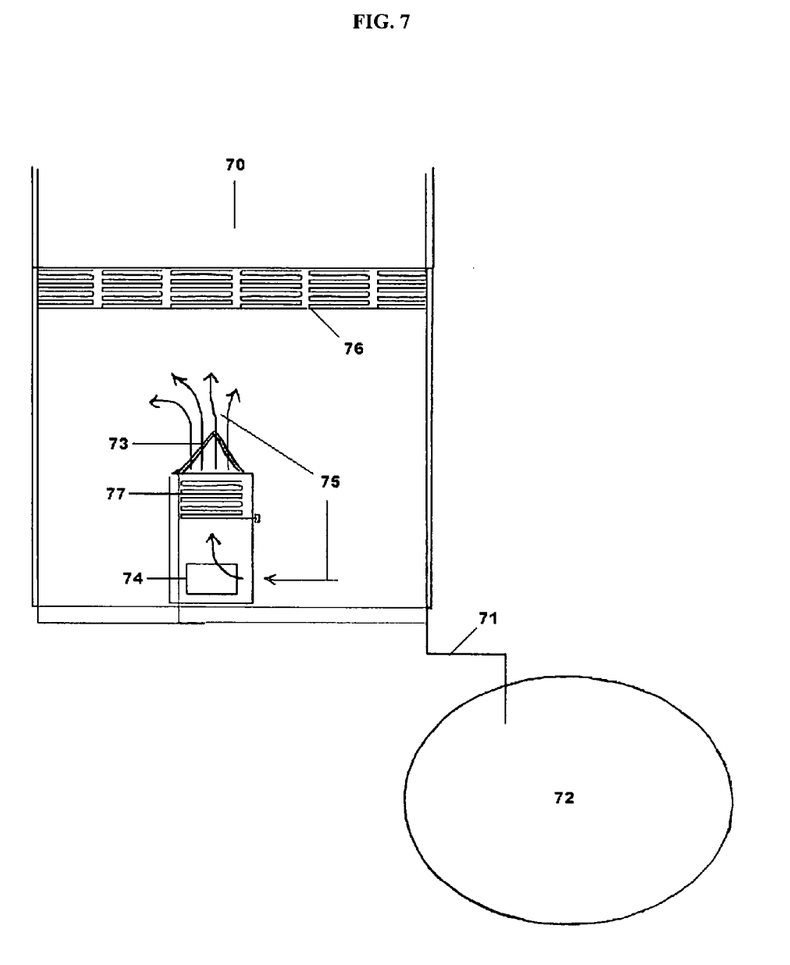
FIG. 7 is a simplified illustration of an exemplary building heat exchange system built in accordance with the present invention.

With reference to FIG. 7, the building heat exchange system is shown in a basement installation 70. This distributes heat and cold to the building as needed. Heat exchange fluid is pumped through lines 71 from the heat sink 72 into the A-Coil 73 mounted in series with the multispeed fan 74. The building air is circulated through ducts to the rest of the building as indicated by arrows 75. In another embodiment, the heat exchange fluid is routed through tubing 76 in the floors of the building for radiant heat. In another embodiment, the A-coil 73 and radiant floor tubing 76 are connected in series, such that the central processing unit can elect to utilize either or both at any given time. In another embodiment, electric resistance heat may be installed in series with the fan 74 and A-coil 73.

The central processing unit (CPU) 14 is generally configured to run software that controls the system 10. Accordingly, the CPU 14 receives input signals from the system 10 and provides instruction signals to the various system components. The signals sent by and received at the CPU may be provided over wired or wireless communication channels, as will be recognized by those of skill in the art.

The CPU may be provided using a standard microprocessor available to individuals as part of a common desktop or laptop computer. However, the CPU may also be provided completely separate from a desktop or laptop computer, and may be provided as part of a dedicated system computer. The CPU may be conveniently located at any of various locations within the home or building. Alternatively, the CPU may be provided outside of the home or building. For example, the CPU may be provided at a remote server that communicates with the system components over the internet. Of course, one of skill in the art will recognize these and various other available arrangements for the CPU.

Concerning the heat and cold collection systems, the preferred embodiment is different for various geographical regions since various climates offer different heat and cold collection opportunities and create different consumer demands. Climate also influences heat sink size and design requirements and the inputs for algorithms of the programming the central processing unit.

Accordingly, the central processing unit (CPU) makes a determination which layer or layers from which to collect heat to supply the building's needs. For example, in FIG. 8, the CPU has determined that 120 degree fluid is currently required to supply the building needs. With the fluid returning at 90 degrees, and considering other inputs, the CPU has determined to first route the fluid through the coils of the third layer 86 which is currently 108 degrees and then through the coils of the second layer 87 which is currently 126 degrees. The CPU will normally opt to use the lowest temperature layers possible in order to conserve concentrated heat for times of greatest need, and therefore does not utilize the core 82 in this instance. Likewise the fluid is passed first through the 108 degree layer to minimize the draining of heat from the hotter 126 degree layer.

Generally the CPU makes two main determinations. First, if storage is low and heat or cold is available, collect it. Second, if the building needs heat or cold, supply it. Based on these determinations, the CPU makes additional decisions such as what speed to run the pumps and fans, and where to route the fluids. Of course, these decisions will vary based on many inputs including specific use requirements programmed upon installation.

Figure 9:
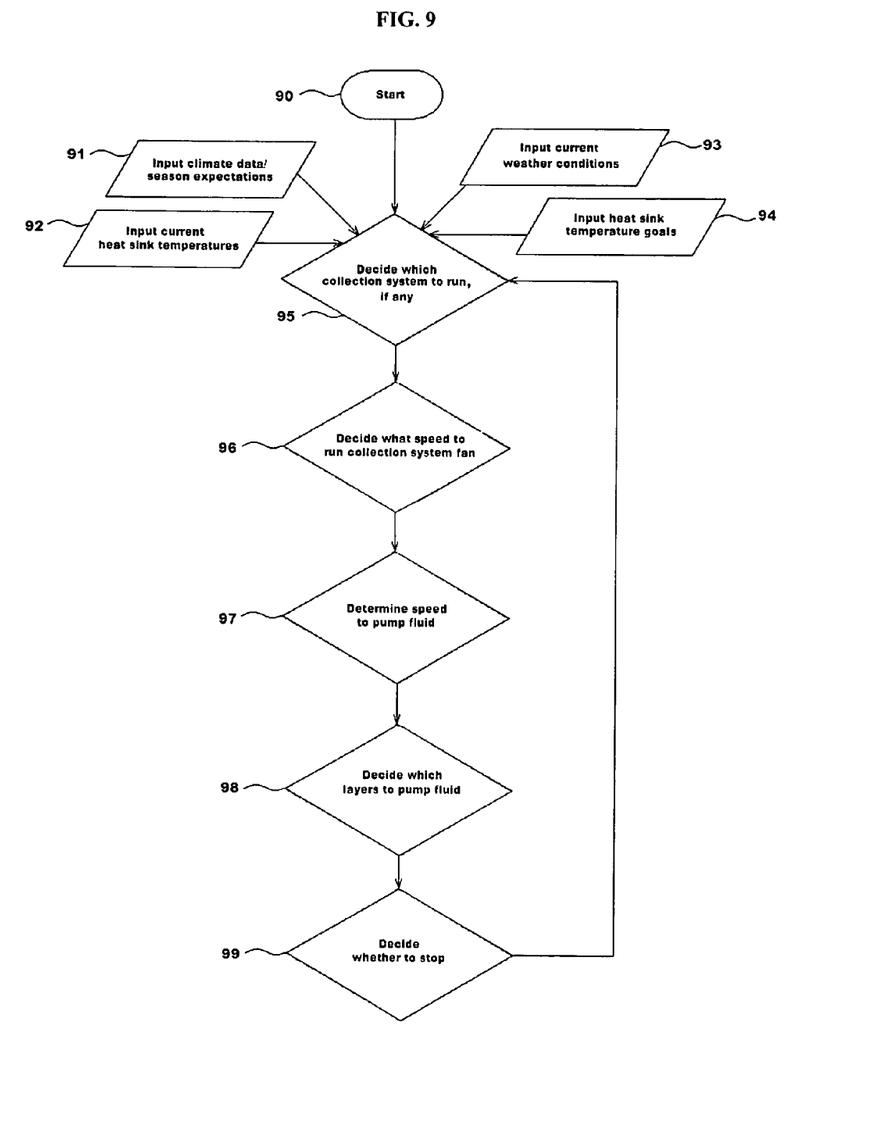
FIG. 9 is a flowchart illustrating the decisions for collecting heat or cold.

The heat collection decisions are outlined in FIG. 9. Inputs include climate data and remaining season expectations 91, current heat sink temperatures 92, current weather conditions 93 and heat sink goals 94. The CPU begins 90 by using these inputs to decide which collection system to run, if any 95; what speed to run collection system fan(s) 96; what speed to pump the heat exchange fluid 97; through which heat sink layers to pump the fluid 98, and when to discontinue the process 99.

Figure 10:
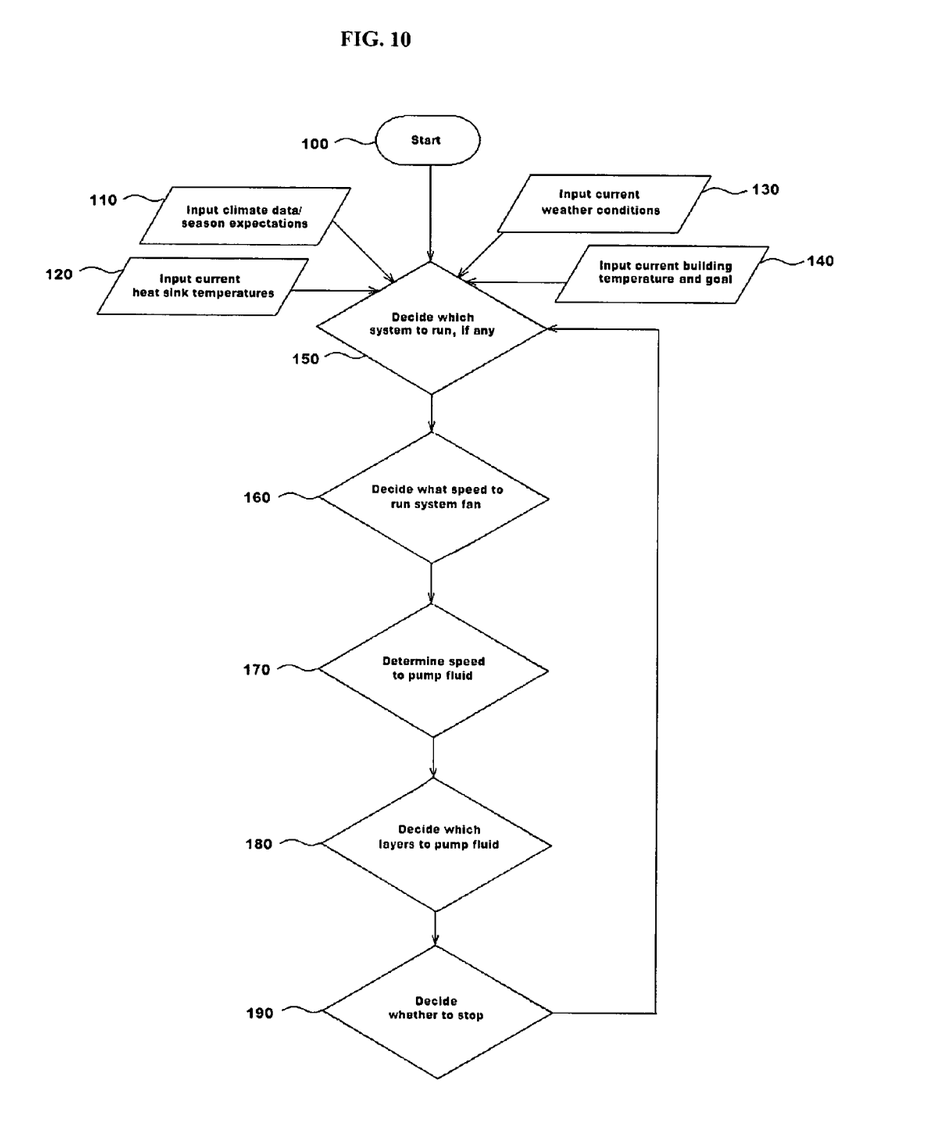
FIG. 10 is a flowchart illustrating the decisions for heating or cooling the building.

As outlined in FIG. 10, the decisions for heating or cooling the building are very similar to the collection decisions. Inputs include climate data and remaining season expectations 110, current heat sink temperatures 120, current weather conditions 130, current building temperatures and building temperature goals 140. The CPU begins 100 by using these inputs to decide which building heating system to run, if any 150; what speed to run building heating system fan or fans 160; what speed to pump the heat exchange fluid 170; through which heat sink layers to pump the fluid 180, and when to discontinue the process 190.

Operation of the system 10 is now described with reference to FIGS. 1, 2 and 4. During warm or sunny weather, the system attempts to collect and store heat in the high temperature heat sink 15 of FIG. 1. During this time, the system will deliver cold from the cold temperature heat sink 19 of FIG. 1 to the building as needed, by causing heat transfer fluid to be pumped to the building heat exchanger 17. Accordingly, when full-speed heat collection is needed to replenish a cool layer of the heat sink 15, the CPU 14 causes heat transfer fluid to be pumped through the lines 12 and through the heat collection system 11. Referring to FIG. 2, the fluid passes through the coils 24 of the ambient heat transfer unit 27 with the fan 23 blowing to preheat the fluid. It then passes through some number of enclosed rafter cavity heat transfer units 22, before flowing through the heat concentrator 21, and then into the return line 25. If an inner heat sink layer such as the core is being replenished, the fluid may be pumped slowly to reach a very high temperature in the heat concentrator 21. If an outer heat sink layer is being replenished, the fluid may be pumped faster to absorb more heat energy, albeit at a lower temperature.

The heat exchange fluid continues through the return line 25 of FIG. 2 to the heat sink 15 of FIG. 1, where it first passes through the layer currently targeted by the CPU 11. Upon exiting the targeted layer, if the fluid has a temperature sufficient to heat another layer or layers, the CPU 14 will route it through those layers as well, before returning it again to the heat collection system 11. There the process repeats until the CPU 11 determines that conditions have changed enough that another combination of fluid route/fan speed/fluid speed is more beneficial or that there is no current benefit from continuing collection, upon which it discontinues the operation.

In a similar manner, the CPU 14 uses inputs from the user interface 13 to determine if the building requires heating or cooling. If cooling is needed, the heat exchange fluid is pumped through the second heat sink 19B to gain cold and then to the building heat exchanger 17 for transfer to the building. If heat is needed, the heat exchange fluid is pumped through the first heat sink 19A to gain heat and then to the building heat exchanger 17 for transfer to the building. Referring to FIG. 7, one embodiment simply uses radiant floor heat 76 to transfer the heat, while in another embodiment, the fan 74 causes air to flow 75 through the A-coil 73 to transfer heat to the building. In extreme weather, an electric heating element 77 may be used to supplement the building heat.

Although its operation is expensive, the electric element 77 is a very inexpensive component to install, and might never be used. It is included only as an emergency back-up or supplement. In another embodiment, both forced air 75 and radiant floor heat 76 may be used either by pumping fluid from two separate source layers or by running the same fluid first through one unit and then the other.

In a similar manner, when full-speed cold collection is needed for a warm layer, the CPU 14, of FIG. 1 causes heat transfer fluid to be pumped through the line 46 of FIG. 4 to the cold collection unit 42. The fluid passes through the coils 24 of the cold collection unit 42 with the fan 43 blowing to cool the fluid. If an inner heat sink layer such as the core is being replenished, the fluid may be pumped slowly to reach a very low temperature. If an outer heat sink layer is being replenished, the fluid may be pumped faster to release more heat energy, albeit at a higher temperature.

The heat exchange fluid continues through the return line 45 of FIG. 4 to the heat sink 19 of FIG. 1, where it first passes through the layer currently targeted by the CPU 11. Upon exiting the targeted layer, if the fluid has a temperature sufficient to cool another layer or layers, the CPU 14 will route it through those layers as well, before returning it again to the cold collection unit 42. There the process repeats until the CPU 11 determines that conditions have changed enough that another combination of fluid route/fan speed/fluid speed is more beneficial or that there is no current benefit from continuing collection, upon which it discontinues the operation.

In some climates, buildings may need only a heat collection and storage system. In other climates, buildings may need only a cold collection and storage system. In still other climates, both systems may be needed, and it may be common for both to run simultaneously, since the best heat collecting opportunities also call for the most cooling needs in the building, and vice versa. So the heat sink may be supplying heat to the building, while the cold storage is being replenished. The opposite may occur in the opposite season.

Although the cold collector 40 is described herein as separate from the ambient heat collector 27. It will be apparent to one skilled in the art that one unit could perform both functions with simple modifications such as making the fan reversible to draw both cold air from outside in winter, and hot air from the attic in summer.

There are, of course, occasional warm, sunny days in winter, and occasional cold nights in summer. The CPU may be programmed to use any opportunity to replenish either the cold or heat storage, regardless of the season.

For a new building, the heat sinks may be installed when excavating. Once the framing is substantially complete, the remainder of the present invention can be installed in the building, so it can begin heat or cold collection immediately. Often final building construction is not complete for more than an entire season, giving the system time to charge. However, at the time of installation it may be determined that some amount of initial charge is desirable. This can be accomplished with the addition of hot or cold water to the earthen mass upon backfilling, or the hot or cold water may be run directly through the coils, or some combination of both methods may be used.

In another embodiment, salts may be dissolved in the water used in those layers of the storage mass where freezing could present expansion problems, in order to lower the freezing points.

In another embodiment, the stored heat may be used to heat water for the building or to heat a warming oven or other household furnishings or appliances. In another embodiment, the stored cold may be used to cool the refrigerator, freezer, or other household furnishings or appliances.

While the invention disclosed herein has been described in terms of several preferred embodiments, there are numerous alterations, permutations, and equivalents which fall within the scope of this invention. It should also be noted that there are many alternative ways of implementing the methods and compositions of the present invention. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A temperature control system for a building, the temperature control system comprising:
   a thermal collection system comprising a plurality of coils including at least one fluid channel with fluid contained within the at least one fluid channel, the thermal collection system configured to heat or cool the fluid within the at least one fluid channel, and the thermal collection system including heat conductive metal sheet material extending from a position above a roof decking of the building to a position below the roof decking, wherein the heat conductive metal sheet material is in direct contact with the at least one fluid channel below the roof decking;
   a first underground heat sink configured to receive the fluid from the thermal collection system, wherein the first underground heat sink absorbs heat from the fluid in order to heat the first underground heat sink;
   a second underground heat sink configured to receive the fluid from the thermal collection system, wherein the fluid absorbs heat from the second underground heat sink in order to cool the second underground heat sink; and
   a heat exchanger configured to receive fluid from the first underground heat sink in order to heat the building, the heat exchanger also configured to receive fluid from the second underground heat sink in order to cool the building.

2. The temperature control system of claim 1 wherein the heat conductive metal sheet material includes flashing attached to the roof decking.

3. The temperature control system of claim 2 wherein the at least one fluid channel is positioned within an attic of the building and wherein the flashing includes a bend that directs the flashing from above the roof decking, between portions of the roof decking, and into the attic.

4. The temperature control system of claim 1 wherein the thermal collection system comprises a fan configured to blow ambient air over the at least one fluid channel.

5. The temperature control system of claim 1 wherein the at least one fluid channel is positioned in a rafter cavity and configured to receive heat absorbed on a roof of the building.

6. The temperature control system of claim 1 wherein the thermal collection system comprises a heat concentrator configured to receive radiant solar energy.

7. The temperature control system of claim 1 wherein the first underground heat sink comprises a core, at least one surrounding layer of water impervious material enveloping the core, and a plurality of fluid channels passing through the first underground heat sink.

8. The temperature control system of claim 7 further comprising at least one valve positioned between the plurality of fluid channels, the at least one valve configured to allow fluid to flow through the at least one surrounding layer without flowing through the core.

9. The temperature control system of claim 7 wherein the core and the at least one surrounding layer are comprised of soil.

10. The temperature control system of claim 7 wherein the first underground heat sink further comprises a water impervious core insulation envelope surrounding the core.

11. The temperature control system of claim 10 wherein the at least one surrounding layer of water impervious material enveloping the core includes a first layer enveloping the core and a second layer enveloping the first layer.

12. The temperature control system of claim 1 wherein the first underground heat sink and the second underground heat sink each comprise:
   a plurality of nested layers including a core and at least one successive layer surrounding the core;
   a plurality of heat sink fluid channels operatively connected to the at least one fluid channel of the thermal collection system, each of the plurality of heat sink fluid channels positioned within one of the plurality of nested layers;
   a fluid input line configured to deliver fluid into the plurality of heat sink fluid channels positioned within the plurality of nested layers; and
   a fluid output line configured to deliver fluid away from the plurality of heat sink fluid channels positioned within the plurality of nested layers.

13. The temperature control system of claim 12 further comprising a plurality of water impervious insulation envelopes, each of the plurality of insulation envelopes surrounding at least one of the plurality of nested layers.

14. The temperature control system of claim 12 further comprising a plurality of valves positioned between the plurality of heat sink fluid channels, the fluid input line and the fluid output line, wherein the plurality of valves are configured to pass fluid through one of the plurality of heat sink fluid channels positioned within one of the plurality of nested layers without passing fluid through a different one of the plurality of heat sink fluid channels positioned in a different one of the plurality of nested layers.

15. The temperature control system of claim 12 wherein each of the plurality of nested layers is comprised of soil.

16. The temperature control system of claim 12 wherein the core is a central core and the plurality of nested layers are substantially concentric with the core.

17. The temperature control system of claim 12 further comprising a controller configured to control the flow of fluid within the at least one fluid channel of the thermal collection system and the flow of fluid within the plurality of heat sink fluid channels, the controller further configured to:
   deliver heated fluid from the thermal collection system to the first heat sink on a summer day such that heat is transferred from the heated fluid to the first heat sink;
   deliver heated fluid from the first heat sink to the heat exchanger on a winter day such that heat is transferred from the first heat sink to the air associated with the heat exchanger;
   deliver cooled fluid from the thermal collection system to the second heat sink on a winter day such that heat is transferred from the second heat sink to the cooled fluid; and
   deliver cooled fluid from the second heat sink to the heat exchanger on a summer day such that heat is transferred from air associated with the heat exchanger to the cooled fluid.

18. The method of claim 17 wherein the controller is further configured to compare recent system usage data to historical system usage data in order to determine whether a problem exists with the system.

19. The temperature control system of claim 17 wherein the controller is further configured to determine at least one operating condition for the thermal collection system based at least in part on at least one current weather condition.

20. The method of claim 19 wherein the at least one operating condition is a pump speed for the thermal collection system, and wherein the controller is further configured to adjust the operating speed of the pump from a first operating speed to a second operating speed, wherein both the first operating speed and the second operating speed of the pump is greater than zero.

21. The method of claim 19 wherein the at least one weather condition is an outdoor temperature.

22. The method of claim 19 wherein the controller is further configured to determine at least one operating condition for the thermal collection system based at least in part on current temperatures of the first heat sink or second heat sink and at least in part on expected heating or cooling requirements for a remaining portion of a season.

* * * * *